July 8, 1941.   V. O. BEAM   2,248,737
PILOT CONTROL
Filed Oct. 21, 1938   2 Sheets-Sheet 1

INVENTOR.
VILYNN O. BEAM
BY Kwis Hudson & Kent
ATTORNEYS

July 8, 1941.   V. O. BEAM   2,248,737
PILOT CONTROL
Filed Oct. 21, 1938   2 Sheets-Sheet 2

INVENTOR.
VILYNN O. BEAM
BY
Kwis Hudson & Kent
ATTORNEYS

Patented July 8, 1941

2,248,737

UNITED STATES PATENT OFFICE 2,248,737

PILOT CONTROL

Vilynn O. Beam, Cleveland Heights, Ohio, assignor to The Bryant Heater Company, Cleveland, Ohio, a corporation of Ohio Application October 21, 1938, Serial No. 236,215

2 Claims. (Cl. 158—115)

This invention relates to improvements in pilot control, that is to say the construction and operation of control means for pilot burners used in fluid fuel heating apparatus, particularly apparatus employing gas.

One of the objects of the invention is the provision of valve means for the pilot gas supply which will furnish sufficient flame in the normal operation of the burner to heat a thermal element to such an extent that it will turn on the main burner gas supply but which, when the heat demand ceases, will reduce the pilot flame to such small dimensions that it will no longer heat such thermal element to the extent necessary to maintain the gas supply to the main burner, although it will still be sufficient to light the main burner in the event that the latter should be turned on again before the thermal element cools completely. My system therefore prevents the possible explosion of gas in the short interval after the master thermostat ceases to call for heat and before the thermal element, which is a secondary control, cools to an extent such that it no longer maintains the gas supply to the main burner.

Another object of the invention is the provision of a two-stage valve for the pilot fuel line capable of closing off the flow either partially or completely, and susceptible of automatic actuation.

Other objects and features of novelty will appear as I proceed with the description of that embodiment of the invention which, for the purposes of the present application, I have illustrated in the accompanying drawings, in which Fig. 1 is a top plan view of a heating coil unit which may be employed in connection with the invention.

In carrying out the invention I provide electrical means for operating the main valve through a circuit that includes the room thermostat switch and also a running switch which is arranged to be closed by a heat responsive element that functions under the influence of the flame from the pilot to close the running switch and maintain it closed so long as a full pilot flame is burning. The pilot flame always burns at its full capacity after it is automatically ignited, except during the off cycle of the system. When the room thermostat ceases to call for heat the pilot valve is caused to close partially and the pilot flame is correspondingly reduced. At about the same time the circuit for the main valve actuator is broken at the room thermostat switch and the main burner is turned off. The reduced pilot flame is sufficient to ignite the main burner in the event that it should be turned on again before the running switch is opened. The reduced pilot flame, however, permits the thermal element to cool partially and contract to an extent sufficient to open the running switch, after which the main burner cannot be turned on again without the system going through the full lighting cycle. The reduced pilot flame continues for a definite time period which is materially longer than the time required to cool the thermal element to an extent sufficient to open the running switch. Thereafter the pilot valve closes completely and remains closed until the room thermostat again calls for heat.

Figure 3:
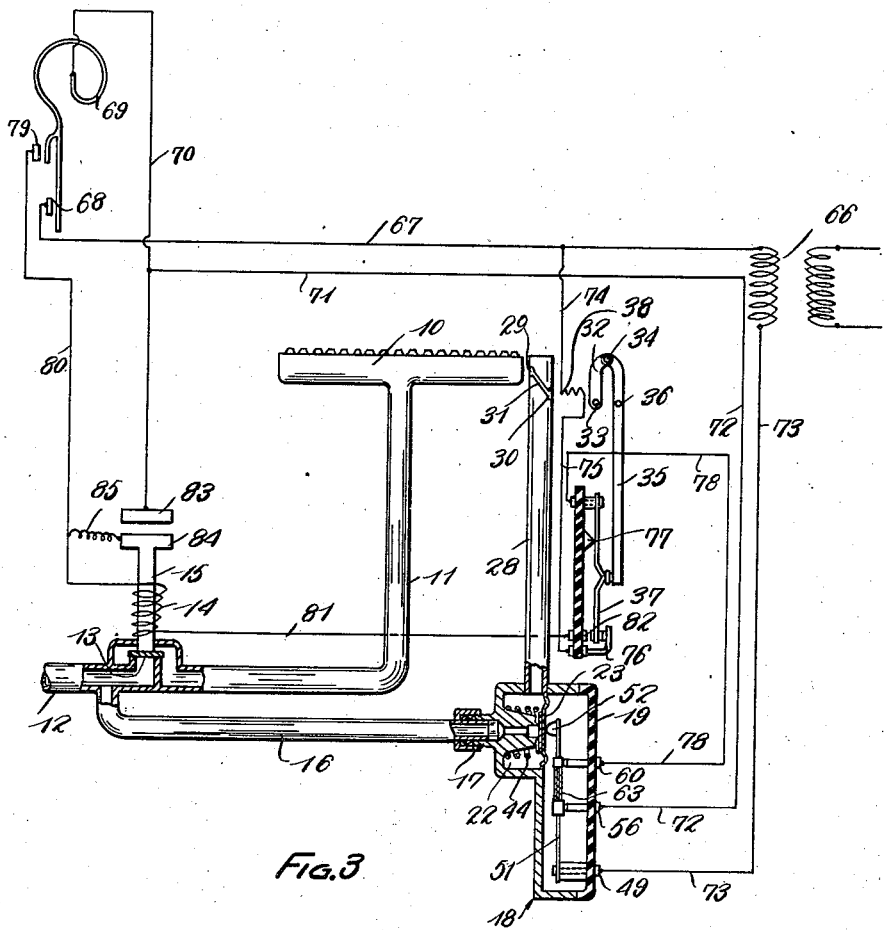
Fig. 3 is a diagrammatic view of apparatus and electrical connections which may be employed in carrying out the invention.

Referring first to Fig. 3 of the drawings, the main burner of a heating furnace is indicated at 10, its supply pipe 11 coming from a gas line 12 with a suitable valve 13 interposed. This valve is electrically operated by any known means or valve motor, that illustrated herein consisting of a simple solenoid 14 surrounding an armature 15 upon the lower end of which the valve is mounted.

From the gas line 12 a pipe 16 leads to a connection 17 upon a heating coil unit that comprises a casting 18 which contains the pilot valve. This unit includes also a cover portion 19 of insulation material in which are mounted certain electrical apparatus and connections later to be described.

In the casting 18 there are formed passages 20 and 21 that are in communication with pipe 16 and lead to the pilot valve which is located in a cavity 22 of the casting, this cavity being separated from the parts above by a diaphragm 23 carrying the valve piece 24. In a laterally arranged boss 26 which is part of the casting there is a drilled passage 25 which extends from the cavity 22 to a threaded socket 27 which receives the pilot tube 28 or a supply tube connected therewith. The upper end of this pilot is provided with gas ports 29 and 30 connected by a slit 31.

Positioned in fairly close proximity to the pilot 28 there is a heat responsive element 32 pivotally mounted at 33 upon a suitable support and pivotally connected at 34 with a lever 35 that is mounted upon a pivot 36 carried by the support. The lever 35 engages the blade 37 of a two-way switch which stands normally in the position in which it is shown in Fig. 3. When the element 32 is heated sufficiently however it elongates and swings lever 35 upon its pivot 36, thereby imparting a push to blade 37 and shifting it to the left. The switch, of which blade 37 is a part, controls the solenoid 14 and also an electric igniter 38 for the pilot.

Figure 1:
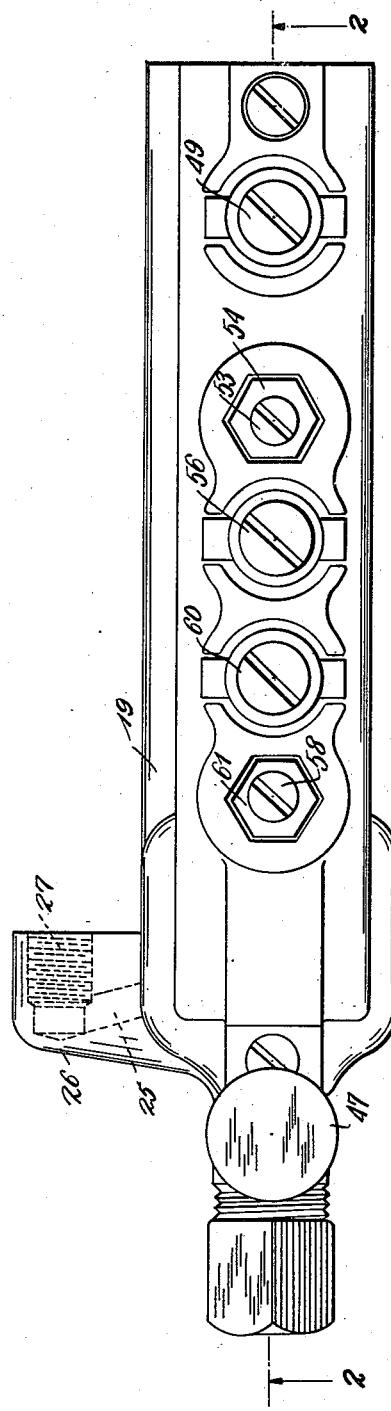
Figure 2:
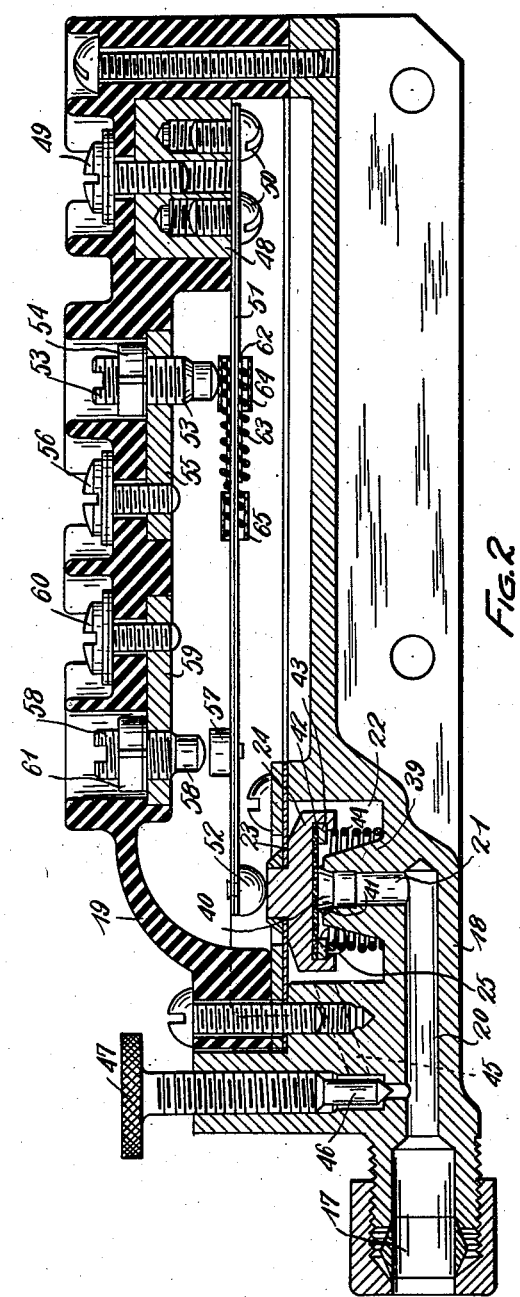
Fig. 2 is a central vertical sectional view taken substantially on the line 2—2 of Fig. 1.
Figure 4:
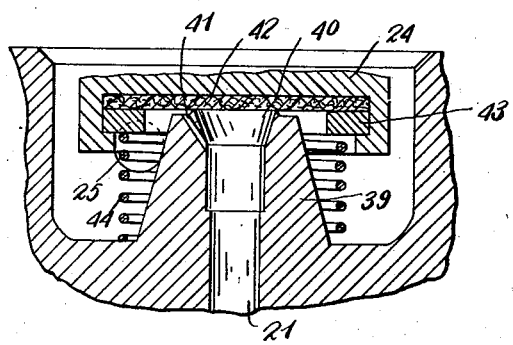
Fig. 4 is a vertical sectional view on an enlarged scale illustrating a fragment of a two-stage pilot valve.

Referring now more particularly to Figs. 1, 2 and 4, the passage 21 terminates in a slightly flared opening at the top of a frustum of a cone 39. The top of this frustum is so machined as to leave a circular ridge 40 at the rim of the opening. The height of this ridge is preferably very small indeed, that is to say of the order of three thousandths of an inch. I also drill a small passage 41 through the frustum outside the ridge 40 to connect the passage 21 with the flat part of the upper end of the frustum 39.

The ridge 40 forms one seat of the valve and the upper surface of frustum 39 outside the ridge forms a second seat, so that the valve is what may be termed a two-stage valve. The valve piece 24 is recessed on its under side to take a gasket 42 of leather or other suitable material which may be held in place by a split ring 43. A coil spring 44 bearing against the ring 43 tends to unseat the valve.

In the casting there is a drilled passage 45 that is controlled by a hand operated needle valve 46 with a knurled head 47, so that the flow through passage 21 and its valve may be by-passed if desired, as for instance in the event of difficulties with the electric system, failure of current, or the like.

At one end of the cover 19 there is a metal insert 48 in which there is a binding post 49. Two screws 50 threaded into the insert 48 serve to mount one end of a bi-metal element 51, the other end of which carries a button 52 which bears upon the upper surface of valve piece 24 and normally holds it depressed to an extent sufficient to close both stages of the valve. The spring force in bi-metal element 51 must be sufficient in a normal condition of the burner to overcome the force of spring 44, and in order to properly control this relation I provide an adjusting screw 53 with a lock nut 54, the screw 53 being threaded in a metal insert 55 in which is mounted a binding post 56. Near its outer end the bi-metal strip 51 carries a metal contact 57 which is adapted to engage a screw 58 that is adjustably mounted in a metal insert 59 which carries a binding post 60. A lock nut 61 holds the screw 58 in its different positions of adjustment.

At an intermediate point in its length bi-metal element 51 is covered with an envelope of insulation 62, around which is wound a heating coil 63. One end of the coil is enclosed in a sheet metal clamp 64 that serves also as a contact for engagement with the screw 53. The other end of the coil projects beyond the insulation 62 where it is fastened and electrically joined to the bi-metal element, as by a metal clamp 65. When the coil 63 is energized to heat the bi-metal element, the latter warps upwardly permitting the spring 44 to raise valve piece 24 so as to open both stages of the pilot valve, and thereafter to bring contact 57 into engagement with screw 58. In Figs. 2 and 4 the pilot valve is illustrated as closed in so far as the first stage is concerned and open as to the second stage.

Referring again to Fig. 3, 66 is a step-down transformer of the type mentioned in my co-pending application Serial No.136,847, filed April 14, 1937. From the low voltage side of the transformer a conductor 67 leads to a contact 68 of a room thermostat or master thermostat 69. From the thermal element of this thermostat conductors 70, 71 and 72 extend to binding post 56 of the heating coil unit, while from the binding post 49 of that unit a conductor 73 extends back to the transformer. A conductor 74 connects conductor 67 with igniter coil 38 from the other side of which a conductor 75 extends to a contact 76 of the two-way switch 77. The fixed end of the blade 37 of this switch is connected by a conductor 78 with the binding post 60 of the heating coil unit. A second contact 79 of the master thermostat is connected by a conductor 80 with solenoid 14, and the latter is connected by a conductor 81 with the other contact 82 of the two-way switch 77. Contact 82 is the running contact, and with blade 37 constitutes the running switch to which reference has been made heretofore. Conductor 70 also extends down to a plate 83 which is adapted to be electrically contacted by a head 84 on the armature 15 when the solenoid 14 is energized, and the head 84 is connected by a flexible conductor 85 with conductor 80.

Operation. When the premises are warm and the thermostat 69 is not calling for heat the system is in the condition illustrated in Fig. 3, and the pilot valve is closed completely, that is as to both stages. Now, when the conditions are such that the thermostat calls for heat it makes engagement first with the contact 68. When this occurs a circuit is set up from the transformer through conductor 67, contact 68, thermostat 69, conductors 70, 71 and 72 to binding post 56, then through insert 55, screw 53 and clamp 64 to heating coil 63, and through the bi-metal member 51 to insert 48 and back through binding post 49 and conductor 73 to the transformer. By this means the heating coil is energized, causing the bi-metal element to warp and open the pilot valve, and shortly thereafter to bring contact 57 into engagement with screw 58.

There is then set up a circuit through the igniter as follows: From the transformer through conductors 67 and 74 to igniter 38, through the igniter and conductor 75 to switch contact 76, through the switch blade 37 and conductor 78 to binding post 60, insert 59, screw 58, contact 57, bi-metal element 51, insert 48, binding post 49, and back to the transformer through conductor 73. The igniter coil then becomes incandescent and ignites the gas emerging from the port 30 in the pilot. The heating of the igniter coil is preferably intermittent, as explained in my said prior application. As soon as the pilot flame lights it plays upon the thermal element 32 and heats the latter, whereupon the lever 35 is swung upon its pivot to move switch blade 37 away from engagement with contact 76 and into engagement with contact 82. When the switch blade 37 is shifted in this manner the circuit through igniter 38 is broken and a circuit is set up through solenoid 14, provided that the thermostat 69 has in the meantime moved to engage contact 79. This circuit may be traced as follows: From the transformer through conductor 67, contact 68, thermostat 69, contact 79, conductor 80, solenoid 14, and conductor 81 to switch contact 82, through switch blade 37 and conductor 78 to binding post 60, through the bi-metal element 51 to binding post 49 and back through conductor 73 to the transformer. The solenoid 14 is thereby energized and the main valve is opened, admitting gas to the burner 10 which is ignited by flame emerging from the port 29 of the pilot. As soon as this occurs, the armature 15 of the main valve is latched up by a circuit from the thermostat through conductor 70, plate 83, armature head 84, and flexible conductor 85, through solenoid 14 and back to the transformer through the two-way switch and the heating unit, as previously described. Hence slight movements of the thermostat do not serve to close the main valve, it being necessary for the thermostat not only to break connection with contact 79 but also with contact 68 before the burner is turned off.

Now, when the furnace has heated the premises sufficiently to cause the thermostat to break connection with both of the contacts 79 and 68, the circuit through the heating coil is broken, the bi-metal element 51 moves down to its position of Fig. 2, and the first stage of the pilot valve is closed. The flow of gas to the pilot is thereby much reduced and the thermal element 32 gradually cools. Sufficient gas flows through the passaage 41 however to maintain a pilot flame large enough to ignite the main burner in the event that the main valve 13 should be opened again before the cooling of thermal element 32 had brought about the movement of switch blade 37 away from contact 82. Of course when the circuit is broken at contact 82 no change in the thermostat setting can open the main valve again without the system passing through the complete lighting cycle.

The parts are so designed and adjusted that the pilot valve remains closed as to its first stage only, that is it remains in the condition of Fig. 4, for a period appreciably longer than the period necessary for the thermal element 32 to cool and cause the switch blade 37 to break connection with the contact 82. After that it is desirable that the pilot valve be turned off completely, and that is what occurs in my system after the residual heat in the bi-metal element 51 is dissipated. Then the button 52 pushes more firmly down upon the valve piece 24, causing the gasket 42 to engage the upper surface of frustum 39 outside the ridge 40 and beyond the passage 41, when the flow of gas is cut off entirely.

In accordance with my invention the pilot flame must continue, after the opening of the room thermostat switch, until the blade 37 moves out of engagement with the running contact 82. Of course, if the reduced flame continues for a time after the running switch is opened no harm is done, and in fact the system is so designed and regulated that the flame will thus continue for an appreciable length of time after the running switch is opened.

Having thus described my invention, I claim:

1. In a control system for gas burners, pilot valve means comprising two seats each controlling a portion of the flow through the valve means, said valve means comprising also seat closure means serving when in one position to engage one of said seats and when advanced a further small increment to engage also the other of said seats, whereby a full or a partial flow of gas to the pilot may be effected or the flow cut off entirely.

2. In a control system for gas burners, a main burner, a pilot burner, pilot valve means comprising two seats each controlling a portion of the flow through the valve means, said valve means comprising also seat closure means serving when in one position to engage one of said seats and when advanced a further small increment to engage also the other of said seats, whereby a full or a partial flow of gas to the pilot may be effected, and thermal means responsive to the heat from the full pilot flame only for maintaining the main burner open.

VILYNN O. BEAM.